US005541728A

United States Patent [19]
Dierking

[11] Patent Number: 5,541,728
[45] Date of Patent: Jul. 30, 1996

[54] SOLID STATIONARY INTERFEROMETER FOURIER TRANSFORM SPECTROMETER

[75] Inventor: Matthew P. Dierking, Springfield, Ohio

[73] Assignee: The United States of America as represented by the Secretary of the Air Force, Washington, D.C.

[21] Appl. No.: 415,408

[22] Filed: Apr. 3, 1995

[51] Int. Cl.⁶ ............................................. G01B 9/02
[52] U.S. Cl. ................................. 356/346; 356/345
[58] Field of Search ................................ 356/345, 346

[56]  References Cited

U.S. PATENT DOCUMENTS 4,915,502  4/1990  Brierley ............................... 356/346
5,223,910  6/1993  Simeoni et al. ....................... 356/346

Primary Examiner—Frank Gonzalez
Assistant Examiner—Amanda Merlino
Attorney, Agent, or Firm—Bobby D. Scearce; Thomas L. Kundert

[57]  ABSTRACT

A stationary Fourier transform spectrometer is described which includes an interferometer including a substantially solid assembly of a beamsplitter, two right angle prisms and a pentaprism of preselected respective aperture sizes, a radiation source, a Fourier transform lens and an optical detector.

9 Claims, 1 Drawing Sheet

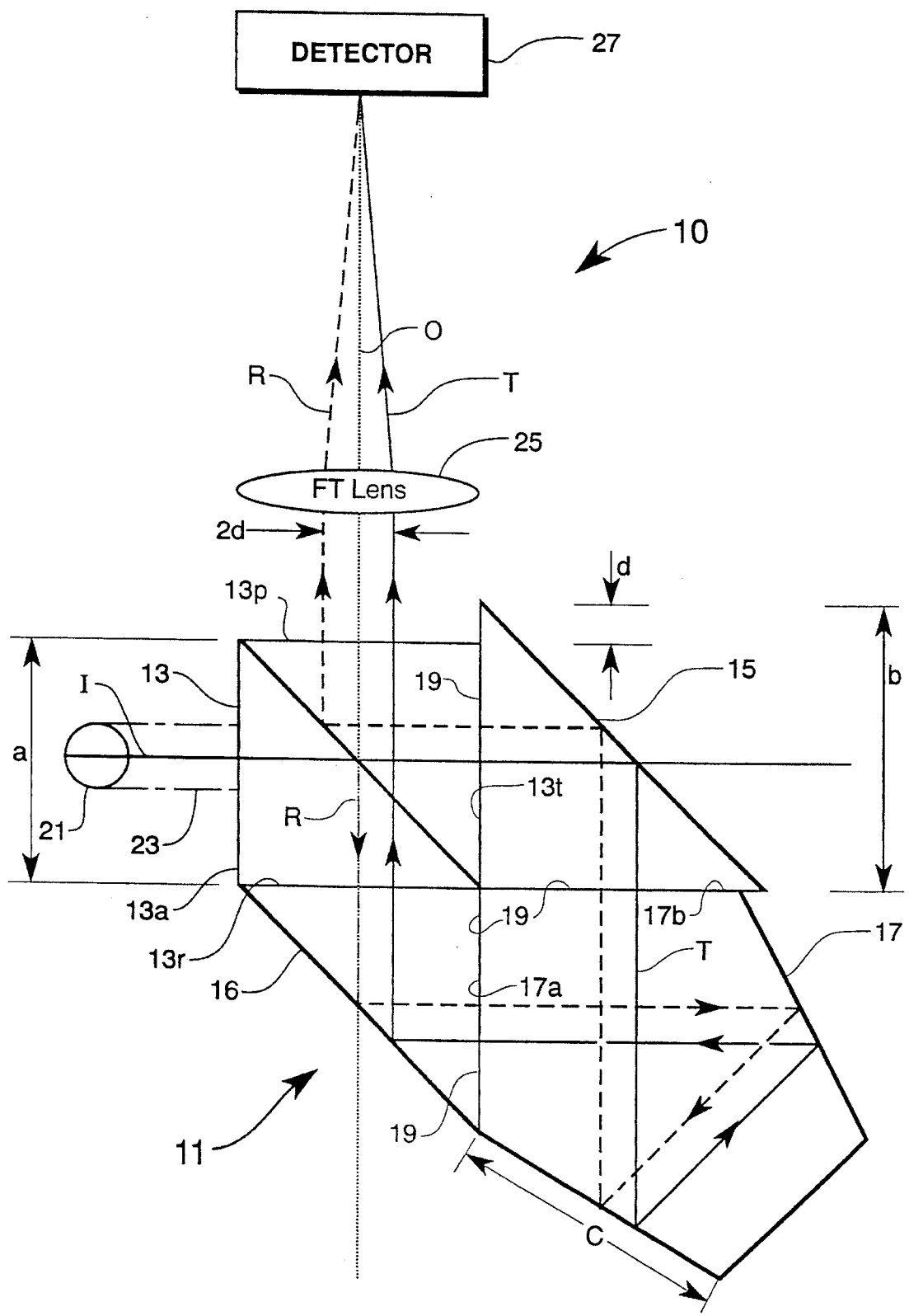

SOLID STATIONARY INTERFEROMETER FOURIER TRANSFORM SPECTROMETER

RIGHTS OF THE GOVERNMENT

The invention described herein may be manufactured and used by or for the Government of the United States for all governmental purposes without the payment of any royalty.

BACKGROUND OF THE INVENTION

The present invention relates generally to spectrometer systems, and more particularly to a stationary Fourier transform spectrometer including a substantially solid interferometer.

The Fourier transform (FT) spectrometer is a powerful spectroscopic tool facilitating high spectral resolution measurements of weak radiation sources, and provides a substantially higher signal-to-noise ratio than do dispersive spectrometers or wide field-of-view and input apertures. Existing stationary FT spectrometer systems generally require precision scanning mechanisms and use beamsplitters and air-spaced mirrors which are subject to loss of alignment resulting from temperature variation, vibration, mechanical drift or mechanical shock, and are therefore limited in use generally to laboratory and other controlled environments.

The invention eliminates or substantially reduces in critical importance problems with prior art FT spectrometer systems by providing a rugged, low-cost stationary FT spectrometer including a single, substantially solid interferometer comprising an assembly of a beamsplitter and three internally reflecting prisms, and which is therefore substantially immune to alignment perturbations. The invention operates in a source doubling mode wherein the beamsplitter divides input radiation into two beams directed separately through a novel combination of two 90° prisms and a pentaprism. The resolution of the interferometer is related to the difference in aperture sizes of the 90° prisms.

The invention is useful in various applications such as spectrochemical analyses of hazardous wastes, pollution control spectral sensors for the field detection of volatile organic compounds in situ at hazardous waste sites, time resolved spectral monitors for high speed industrial processes, remote sensing of chemical effluents in smoke stacks or other waste streams, high intensity optical detection systems, or otherwise in hostile environments to which conventional interferometers are not suited.

It is therefore a principal object of the invention to provide an improved FT spectrometer.

It is a further object of the invention to provide a stationary FT spectrometer including a substantially solid interferometer.

It is yet another object of the invention to provide a compact, rugged, low-cost stationary FT spectrometer which is substantially immune to alignment perturbations or to loss of calibration and is substantially insensitive to shock and temperature extremes.

It is a further object of the invention to provide a novel, substantially solid interferometer.

These and other objects of the invention will become apparent as a detailed description of representative embodiments thereof proceeds.

SUMMARY OF THE INVENTION

In accordance with the foregoing principles and objects of the invention, a stationary Fourier transform spectrometer is described which includes an interferometer comprising a substantially solid assembly of a beamsplitter, two right angle prisms and a pentaprism of preselected respective aperture sizes, and a radiation source, a Fourier transform lens and an optical detector.

DESCRIPTION OF THE DRAWINGS

The invention will be more clearly understood from the following detailed description of representative embodiments thereof read in conjunction with the accompanying drawing which is a schematic diagram of a representative embodiment of the FT spectrometer and interferometer taught by the invention.

DETAILED DESCRIPTION

Referring now to the drawing, shown therein is a schematic illustration of a representative embodiment of a spectrometer system taught by the invention. In accordance with a principal feature of the invention, system 10 includes interferometer assembly 11 which, in a preferred embodiment, includes non-polarizing cube beamsplitter 13 and substantially totally internally reflecting right angle prisms 15,16 and pentaprism 17. Beamsplitter 13 includes a face 13a comprising the input aperture for assembly 11, as discussed more fully below, face 13r through which optical reflection axis R is defined, face 13t through which optical transmission axis T is defined, and face 13p comprising the output aperture of assembly 11. Prisms 15 and 16 are disposed in substantially abutting relationship to beamsplitter 13 at respective faces 13t,13r, substantially as shown in the drawing, with the right angle faces 17a, 17b of pentaprism 17 in abutting relationship with the remaining respective right angle faces of prisms 15,16. Beamsplitter 13 and prisms 15,16,17 of assembly 11, substantially as shown in the drawing, are then held in optical alignment by any suitable means, such as mechanically using ultraviolet cured index matching optical cement 19 at the abutting interfaces. Beamsplitter 13 and prisms 15,16,17 may be precision aligned using a reference source disposed at the position indicated for light source 21 of system 10. When beamsplitter 13 and prisms 15,16,17 are aligned and held together in the configuration depicted in the drawing, assembly 11 comprises a substantially single glass block interferometer. Two optical axes are then defined through assembly 11 along the paths taken by the reflected and transmitted beams through beamsplitter 13. Aperture sizes for beamsplitter 13 may ordinarily range from about 0.314 to 2.0 inch. In an interferometer assembly 11 built according to the invention, beamsplitter 13 and prisms 16,17 each had an aperture a equal to 0.393 inch, and prism 15 had an aperture b equal to a+d (d may equal 0.0078 to 0.393 inch; in the demonstration unit, 0.393 inch) as suggested in the drawing and discussed more fully below; the c dimension of pentaprism 17 is typically 1.0824a. In an assembly 11 built in demonstration of the invention, beamsplitter 13 and prisms 15,16,17 comprised borosilicate crown glass (BK7), but may comprise other low dispersion optical materials, such as fused silica, barium oxide glass (SK) or fluorite glass, as would occur to the skilled artisan practicing the invention. Angular tolerance of each element of assembly 11 is typically 30 arc sec. The dimensions given herein for the elements comprising assembly 11 are representative only of an embodiment of the invention, and may be selected by one skilled in the art guided by these teachings, the precise dimensions not considered limiting of the invention. Source 21 of any selected wavelength or spectrum of wavelengths may be disposed substantially as shown in the drawing to direct beam I of input radiation into assembly 11 at input aperture 13a of beamsplitter 13. The input radiation may be uncollimated to avoid distortions introduced by off-axis rays from source 21. Any form of optical coupling means 23 may be used to direct input radiation into assembly 11, such as a conventional lens and mirror system, collimating lenses and filters, or, preferably, fiber optic connector means, as would occur to the skilled artisan guided by these teachings.

Fourier transform (FT) lens 25 is disposed along output optical axis O of assembly 11 to direct output radiation to detector array 27 comprising a spatially resolved detector, such as a one-dimensional charged couple device (CCD) (RL1024, EG&G Ortec, Inc.), an optical multichannel analyzer (OMA, Princeton Instruments, Inc.), or a two-dimensional CCD array (WV-BD400, Panasonic, Inc.). In an alternative embodiment of the invention (not shown), the interferometer assembly may include an FT lens integrated into the prism assembly, such as by cementing lens 25 to output face 13p to form a single optical unit; such a modification would likely not provide additional interferometric stability, because lens 25 alignment is not as critical as the alignment of the assembly 11 elements.

In the operation of system 10, the image presented by input radiation beam I is doubled in passing through interferometer assembly 11. Input radiation beam I is split at beamsplitter 13 into transmitted beam T (shown as a solid line, arrows indicating transmission direction) and reflected beam R (shown as a broken fine, arrows indicating transmission direction), each of which are transmitted through assembly 11 substantially along a common optical axis, but in opposite directions, as suggested by the arrows, to output face 13p along optical axis O. In traversing assembly 11, beam R experiences two reflections at beamsplitter 13 and beam T experiences two transmissions at beamsplitter 13. Beams R,T, being recombined along axis O, are collimated by FT lens 25 and directed along axis O to detector 27. The difference in aperture sizes between prisms 15,16 contributes to a displacement d for each beam R,T which results in a total displacement equal to 2d between beams R,T at output aperture 13p along axis O. Resolution of system 10 is therefore dependent upon the difference in aperture sizes of prisms 15,16. If source 21 and detector 27 are disposed at respective focal planes of FT lens 25, source 21 and detector 27 comprise an FT pair and all point pairs from the two virtual images of source 21 represented by beams R and T contribute to the same fringe spacing at corresponding locations on the detector plane of detector 27.

Consider an input beam I having circular cross section of radius $r_s$. Power emitted from an incremental slice of source 21 having area $dA_f = 2r_f^2 \sin^2\phi d\phi$ and received by lens 25 having area $A_L$ is:

$$L(\lambda)\Omega A_L \frac{dA_f}{A_f} = I_o \frac{dA_f}{A_f} \qquad (1)$$

where $L(\lambda)$ is the radiance of source 21 and $\Omega(\approx \pi r_f^2/f^2)$ is the solid angle subtended by source 21 at lens 25 and f is the focal length of lens 25. The total radiant power $I_o$ emitted from source 21 is $L(\lambda) \Omega A_L$. The detected power from source 21 is the integral over all source angles:

$$I_\lambda(x) = I_o(\lambda) + I_o(\lambda)/\pi r_f^2 \int_0^x \cos\left[\frac{2\pi}{\lambda} \Gamma(x)\right] 2r_f^2 \sin^2\phi d\phi \qquad (2)$$

The optical path difference $\Gamma(x)$ for assembly 11 is $2dx/f$, where $2d$ is the image separation between beams R,T along axis O. The maximum optical path difference for the system is (L/2)2d/f where L is the aperture size of lens 25. Substituting for $\Gamma(x)$ in Eq (2) and integrating over 0 to x yields the intensity for a monochromatic source:

$$I_\lambda(x) = I_o(\lambda) + I_o(\lambda)\cos\left(\frac{2\pi}{\lambda} \frac{x2d}{f}\right) \qquad (3)$$

For a polychromatic source, the individual wavelengths are superimposed and $I_\lambda(x)$ is integrated over the range of wavelengths in source 21 yielding the total interferogram intensity on detector 27 as:

$$I(x) = \int_{\lambda_1}^{\lambda_2} I_o(\lambda) + I_o(\lambda)\cos\left(\frac{2\pi}{\lambda} \frac{x2d}{f}\right) d\lambda \qquad (4)$$

Eq (4) shows that the interference fringe pattern $I_d(X)$ contrast is independent of the spatial extent of source 21, and is truncated by the finite length of the detector 27 array:

$$I_d(x) = I(x) \, G(x) \qquad (5)$$

where and G(x) is the rectangular gating function at detector 27. The ultimate spectral resolution of system 10 is limited by the maximum number of fringes obtained for a given wavelength. Resolving power R of system 10 may be given by:

$$R = 0.6\lambda_c 2d \, w_d/\lambda^2 f \qquad (6)$$

where $\lambda_c$ is the cutoff wavelength and $W_d$ is the width of the detector 27 array.

The invention therefore provides a low-cost, compact stationary FT spectrometer and solid block interferometer. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. An interferometer, comprising:

(a) a cube beamsplitter, having a first face defining an input aperture of preselected size, for receiving an input beam of radiation and splitting said input beam into a reflected beam and a transmitted beam directed along respective first and second mutually perpendicular axes, said beamsplitter having second and third mutually perpendicular faces defined along respective said first and second axes;

(b) a pentaprism having first and second mutually perpendicular faces, each having an aperture size corresponding to the aperture size of said beamsplitter, and internally reflecting third, fourth and fifth faces;

(c) a first internally reflecting right angle prism having first and second mutually perpendicular faces, each having an aperture size corresponding to the aperture size of said beamsplitter, and an internally reflecting third face, said first right angle prism disposed along one of said first and second axes with said first and second faces thereof in registering contact respectively with one of said second and third faces of said beamsplitter and one of said first and second faces of said pentaprism; and (d) a second internally reflecting right angle prism having first and second mutually perpendicular faces, each having a preselected aperture size larger than the aperture size of said beamsplitter, and an internally reflecting third face; said second right angle prism disposed along the other of said first and second axes with said first and second faces thereof in contact respectively with the other of said second and third faces of said beamsplitter and the other of said first and second faces of said pentaprism.

2. The interferometer of claim 1 wherein said beamsplitter has an aperture size of about 0.314 to 2.0 inch and said second right angle prism has an aperture size of about 0.323 to 2.393 inch.

3. The interferometer of claim 1 further comprising index matching optical cement at the interfaces of said beamsplitter, first and second right angle prisms and pentaprism, for holding said beamsplitter, first and second right angle prisms and pentaprism in a substantially unitary assembly.

4. The interferometer of claim 1 wherein said beamsplitter, first and second right angle prisms and pentaprism comprise a low dispersion optical material selected from the group consisting of fused silica, borosilicate crown glass, barium oxide glass and fluorite glass.

5. A stationary Fourier transform spectrometer, comprising:

(a) a source of radiation;

(b) an interferometer, including:
   a cube beamsplitter, having a first face defining an input aperture of preselected size, for receiving an input beam of radiation from source and splitting said input beam into a reflected beam and a transmitted beam directed along respective first and second mutually perpendicular axes, said beamsplitter having second and third mutually perpendicular faces defined along respective said first and second axes, and an output face adjacent said first face for directing an output beam of said interferometer along an output axis thereof;
   a pentaprism having first and second mutually perpendicular faces, each having an aperture size corresponding to the aperture size of said beamsplitter, and internally reflecting third, fourth and fifth faces;
   a first internally reflecting right angle prism having first and second mutually perpendicular faces, each having an aperture size corresponding to the aperture size of said beamsplitter, and an internally reflecting third face, said first right angle prism disposed along one of said first and second axes with said first and second faces thereof in registering contact respectively with one of said second and third faces of said beamsplitter and one of said first and second faces of said pentaprism; and
   a second internally reflecting right angle prism having first and second mutually perpendicular faces, each having a preselected aperture size larger than the aperture size of said beamsplitter, and an internally reflecting third face, said second right angle prism disposed along the other of said first and second axes with said first and second faces thereof in contact respectively with the other of said second and third faces of said beamsplitter and the other of said first and second faces of said pentaprism;

(c) a Fourier transform lens disposed along said output axis of said interferometer; and (d) an optical detector.

6. The spectrometer of claim 5 wherein said optical detector is a one-dimensional charged couple device, an optical multichannel analyzer, or a two dimensional charged couple device.

7. The spectrometer of claim 5 wherein said beamsplitter has an aperture size of about 0.314 to 2.0 inch, and said second right angle prism has an aperture size of about 0.323 to 2.393 inch.

8. The spectrometer of claim 5 further comprising index matching optical cement at the interfaces of said beamsplitter, first and second right angle prisms and pentaprism for holding said beamsplitter, first and second right angle prisms and pentaprism in a substantially unitary assembly.

9. The spectrometer of claim 5 wherein said beamsplitter, first and second right angle prisms and pentaprism comprise a low dispersion optical material selected from the group consisting of fused silica, borosilicate crown glass, barium oxide glass and fluorite glass.

\* \* \* \* \*